United States Patent Office 3,380,556
Patented Apr. 30, 1968

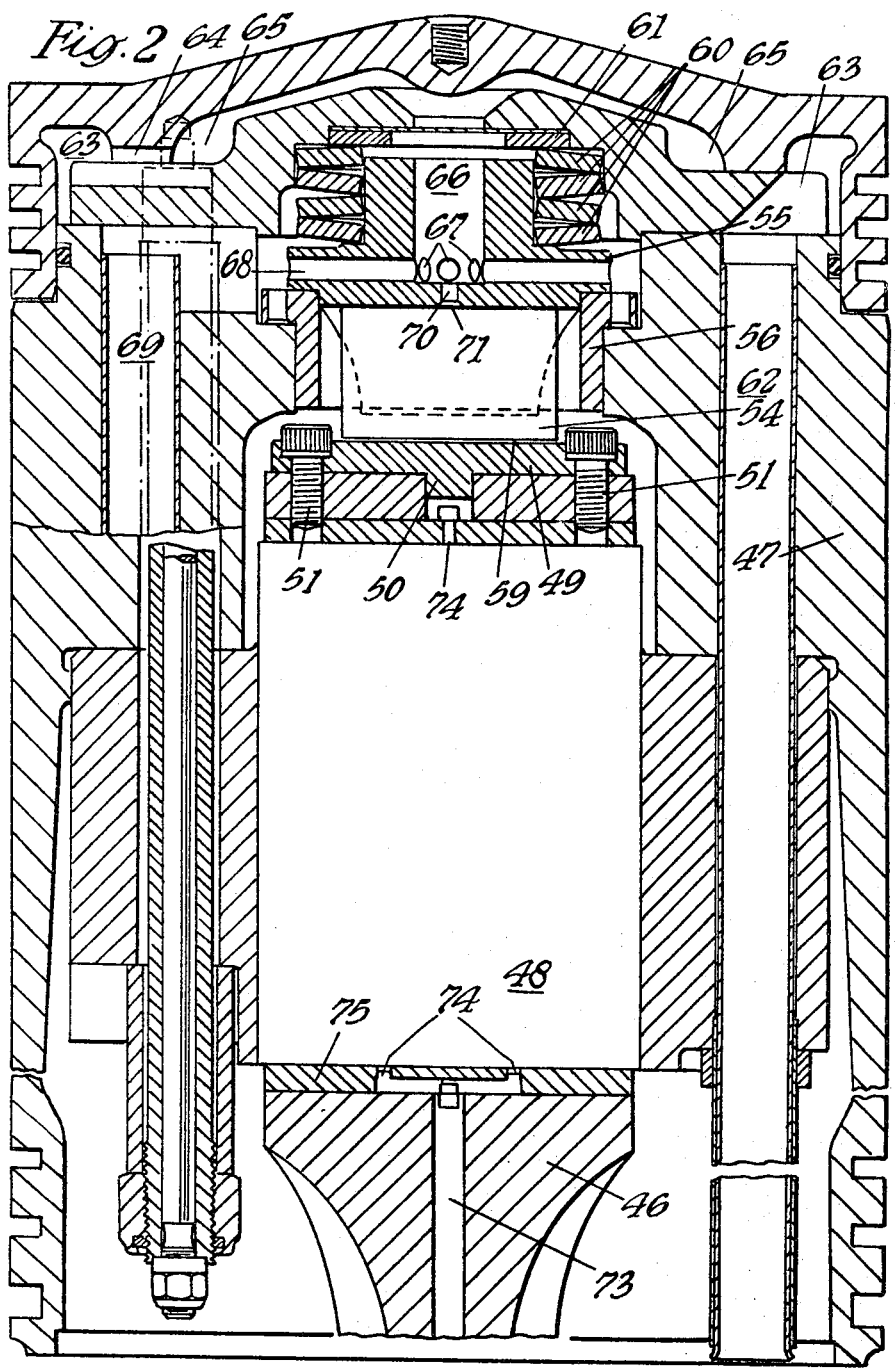

3,380,556
LUBRICATING MEANS FOR OSCILLATORY BEARINGS
Herbert A. Whitehead, Skellingthorpe, Lincoln, England, assignor to Ruston & Hornsby Limited, Lincoln, England, a company of Great Britain
Filed Oct. 18, 1965, Ser. No. 496,926
Claims priority, application Great Britain, Oct. 21, 1964, 42,837/64
2 Claims. (Cl. 184—6)

ABSTRACT OF THE DISCLOSURE

In the lubrication of uni-directionally loaded oscillating bearings, a cam and follower mechanism between associated relatively oscillating parts is arranged to separate the bearing surfaces to allow lubrication at that time in the operational cycle when the bearing load is lowest.

---

Figure 1:
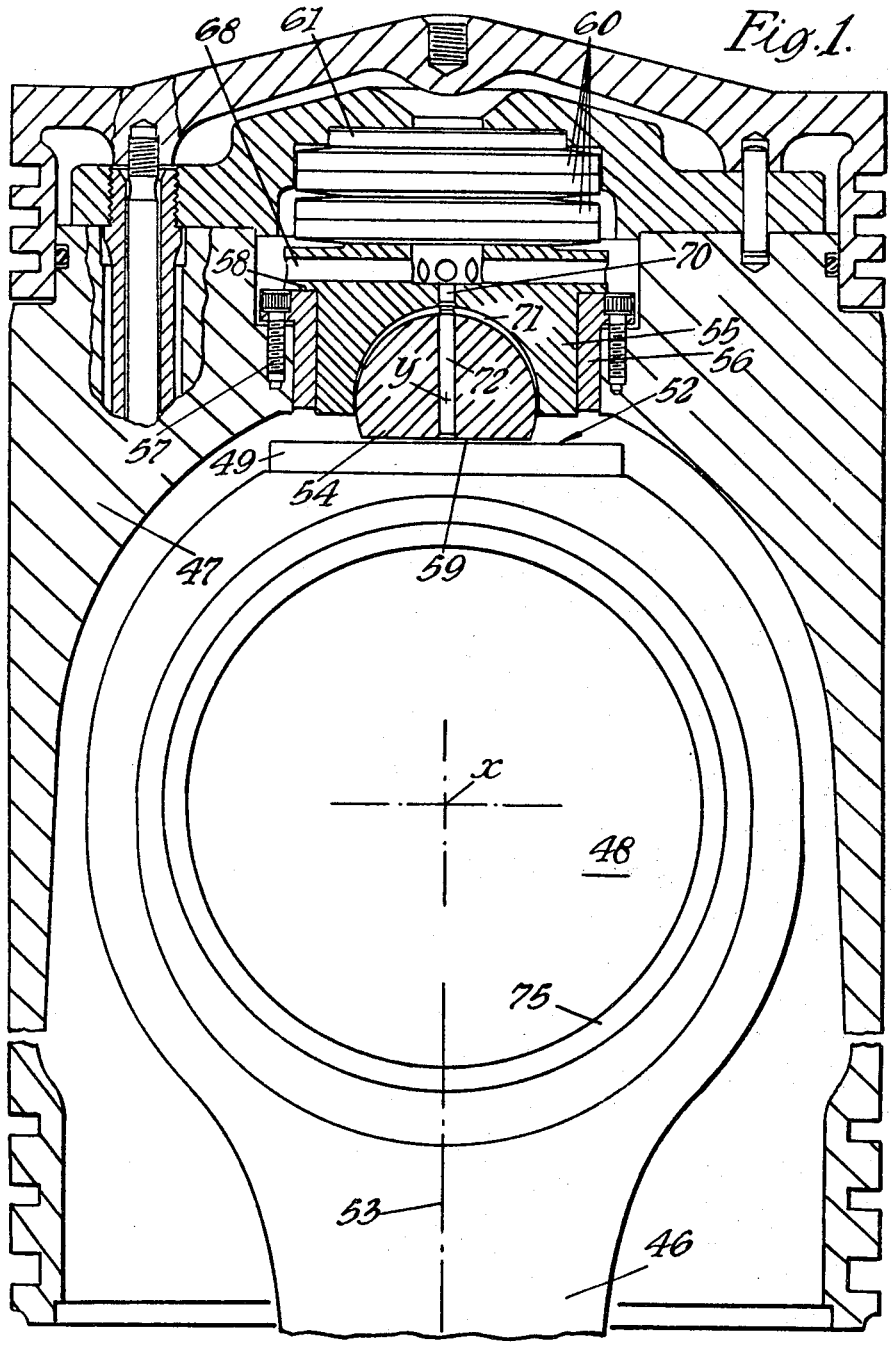

This invention relates to a bearing of the kind comprising a pin, and a bush or shell embracing the pin, so that the one is capable of an oscillatory movement about their common axis relatively to the other.

The problem with which the invention is concerned is that of the adequate lubrication of certain parts of the mating surfaces of the pin and its bush or shell, which parts are difficult of lubrication because of being in a continuous state of heavy loading.

More particularly (but from the foregoing obviously not exclusively), the invention relates to engines, pumps, compressors, and the like machines having reciprocating pistons, each piston being connected to a crankshaft by a connecting rod which at its small-end is pivoted to the piston rod through a gudgeon pin, also known as a piston pin or wrist pin. There, especially in those working on a two-stroke cycle, the loading on the gudgeon pin bearing tends to be unidirectional, that is to say, there is a substantially continuous compressive radial load on part of the pin and the mating part of its bearing during operation; and the lubricating oil has little chance of flowing to that part of the bearing.

It is obviously undesirable that some part of a bearing for an angularly moving pin should suffer any restriction in respect of the supply of lubricant, especially when that part is under pressure; and it is an object of the present invention to obviate or at least reduce this disadvantage. This the invention does by arranging for the pressure between parts of the bearing-bush or shell and the associated pin to be relieved mechanically at an interval or intervals in the cycle of motion whereby the bearing surfaces are parted so that lubricant can flow into the space so created to lubricate and incidentally cool the surfaces with which it is in contact.

The following description relates to the accompanying drawings, showing, by way of example only, one embodiment of the invention. In the drawings:

FIGURE 1 is a central cross-section of the piston and its gudgeon pin of a single-cylinder direct-reversing two-stroke engine, the present invention being applied to improve the lubrication of the gudgeon pin bearing; and FIGURE 2 is a central cross-section at right angles to the section shown in FIGURE 1.

The drawings show the invention applied to the connecting rod small-end of a direct-reversing two-stroke engine, where connecting rod 46 is pivoted to its piston 47 by a gudgeon pin 48.

Coming straight to the means provided to carry out the present invention, it will be seen that the upper extremity of the connecting rod 46 has a flat on which is seated a cam 49 located by a spigot 50 and secured by screws 51.

The profile of the cam is flat, and located normal to and symmetrical about the connecting rod axis 53. The cam-follower is a slipper 54 and is carried in a partially cylindrical recess in a plunger 55 in such manner that the axis $y$ of follower 54 is always parallel with the axis $x$ of gudgeon pin 48. Plunger 55 is slidably reciprocable within a guide 56 secured as by screws 57 to a recess in piston 47. Plunger 55 seats at the lowest extremity of its travel on a shoulder 58 of guide 56 to leave a small clearance 59 between follower 54 and cam profile 52 when the connecting rod axis is at right angles to the crankshaft axis, or when the associated piston is at top or bottom dead-centre. Upward travel of plunger 55 is limited or spring-opposed to achieve the object of producing a clearance between the loaded parts of the gudgeon pin and small-end bearing. As shown, the upward travel of plunger 55 is opposed by (preferably pre-loaded) spring means reacting against a fixed part of the piston. The upper portion of plunger 55 is formed as a spring collar and guide, partially or wholly hardened to carry a compression spring or a plurality of disc springs 60 reacting against a hardened washer 61 secured to a fixed part of the piston. The spring means 60 is given an initial pre-compression or preloading at assembly to enable a higher spring force to be exerted during operation than would otherwise occur. It will be noted that when the parts are in the position shown, the springs 60 are merely forcing plunger 55 on to its seat 58 and no pressure is exerted between plunger 55, follower 54 and cam 49. Follower 54 is thereby unloaded at both top and bottom dead-centre positions of the piston, facilitating lubrication thereof.

The pressure-relieving means is lubricated, and the piston crown is cooled, by oil from the engine lubricating system supplied via passages 62, 63 and 64 to space 65 under the piston crown, to bore 66, through ports 67 or passages 68 from whence some of the oil drains through passages 69 and some of the oil flows through bore 70 in plunger 55 to groove 71 and to bore 72 to lubricate the moving parts. The gudgeon pin and small-end bearing may be lubricated independently through conventional passages 73 and grooves 74.

The connecting rod small-end bearing which carries gudgeon pin 48 may consist of conventional bearing-shells or a bush 75.

In opertaion, as the connecting rod swings outwardly, i.e. away from the dead-centre position in either direction, during a compression stroke, the clearance is taken up and follower 54 begins to lift on cam 49. Load then begins to be applied through springs 60 and washer 61 to the piston 47. As long as the available spring force is greater than the downward load on the small-end bearing, the piston will lift in relation to small-end bush 75, possibly reaching a maximum at which it is limited by the clearance between the gudgeon pin 48 and the small-end bearing or bush 75. During the lift period, oil will be able to flow between the separated parts of the normally uni-directionally loaded bearing. As the connecting rod 46 swings back from its maximum angular position towards its mean, the available pressure-relieving force will gradually be reduced until the gudgeon pin 48 is again in its normal position in the small-end bearing or bush 75. As the connecting rod continues to swing past its mean position to begin the firing stroke, load is again applied to the spring 60, but at this part of the cycle the gas and inertia loads cannot be overcome and the spring is compressed to the maximum lift of the cam without a clearance being created in the bearing parts. In the latter-mentioned movement no useful result has been achieved; but in engines where the engine rotation is reversible it is necessary that the system should work in both directions.

It will be understood that in the foregoing description terms such as "upper" and "lower" and "vertical" are used for convenience of identification only and without spatial significance.

It will be understood also that the invention may take other forms and that the forms shown may be variously modified. Thus, the cam-follower has been shown in the form of a slipper. This is desirable because of the high stresses developed hereabouts; but there is always the possibility of having the cam-follower as a roller.

Again, the profile 52 of the cam 49 may be convex. It will then desirably have a less degree of curvature than a circle scribed about the centre $x$ of the gudgeon pin at that radius.

Then, especially in a non-reversing engine, it will be possible and may be preferred to have the cam profile offset, non-symmetrical with respect to the axis 53.

What I claim is:

1. A bearing comprising in combination:
   a pin member having an outer peripheral bearing surface;
   a bush member having an inner peripheral bearing surface mating with the outer peripheral bearing surface of said pin member to permit a limited angular oscillation of one member relative to the other member;
   a cam and cam follower means for cyclically relieving pressure due to generally unidirectional loading on the mating surfaces so as to separate the mating surfaces at a selected point in the oscillation corresponding to substantially minimum loading; and
   means for elastically loading said cam and cam follower for limiting the pressure exerted by said cam and follower when said unidirectional loading is other than about its minimum.

2. The combination defined by claim 1 and including means for cyclically relieving pressure generated between said cam and follower and associated parts to allow lubrication thereof.

References Cited

UNITED STATES PATENTS

| 3,056,638 | 10/1962 | Hovde | 92—157 |
| 2,317,004 | 4/1943 | Wallgreen et al. | 92—156 |

FOREIGN PATENTS 505,052   12/1954   Italy.

LAVERNE D. GEIGER, *Primary Examiner.*

H. S. BELL, *Assistant Examiner.*